United States Patent [19]

Spilker et al.

[11] Patent Number: 5,568,936
[45] Date of Patent: Oct. 29, 1996

[54] AIRBAG MODULE CASE FOR SIDE IMPACT AIRBAG MODULE

[75] Inventors: David L. Spilker, Pleasant View; Don L. Parker, Layton; J. Kirk Storey, Farmington, all of Utah

[73] Assignee: Morton International, Inc., Chicago, Ill.

[21] Appl. No.: 555,210

[22] Filed: Nov. 8, 1995

[51] Int. Cl.⁶ .................................................. B60R 21/16
[52] U.S. Cl. ........................................ 280/728.2; 280/732
[58] Field of Search ............................ 280/728.1, 728.2, 280/730.1, 730.2, 731, 732

[56] References Cited

U.S. PATENT DOCUMENTS

| | | | |
|---|---|---|---|
| 3,632,136 | 1/1972 | Foltz | 280/732 |
| 4,246,213 | 1/1981 | Takamatsu et al. | 264/46.7 |
| 4,944,527 | 7/1990 | Bishop et al. | 280/741 |
| 5,112,079 | 5/1992 | Haland et al. | 280/730 |
| 5,179,132 | 1/1993 | Mizuno et al. | 521/174 |
| 5,207,544 | 5/1993 | Yamamoto et al. | 280/728.2 |
| 5,224,732 | 7/1993 | Warner et al. | 280/730 |
| 5,303,951 | 4/1994 | Goestenkors et al. | 280/728 B |
| 5,326,132 | 7/1994 | Musiol et al. | 280/732 |
| 5,348,343 | 9/1994 | Hawthorn | 280/730 R |
| 5,378,013 | 1/1995 | Warner | 280/728 B |
| 5,393,090 | 2/1995 | Shepherd et al. | 280/728.2 |
| 5,427,409 | 6/1995 | Henseler et al. | 280/728.3 |
| 5,433,473 | 7/1995 | Hiramitsu et al. | 280/728.3 |
| 5,435,597 | 7/1995 | Warner | 280/728.3 |
| 5,441,299 | 8/1995 | Lauritzen et al. | 280/732 |
| 5,445,409 | 8/1995 | Abramczyk et al. | 280/728.2 |

*Primary Examiner*—Paul N. Dickson
*Attorney, Agent, or Firm*—George W. Rauchfuss, Jr.; Gerald K. White

[57] ABSTRACT

An airbag module case for use with a side-impact airbag module including an airbag cushion and inflator assembly, and two mounting projections extending from the airbag cushion and inflator assembly and. The airbag module case includes an assembly cover and two unitary, flexible retainer arms. The assembly cover is sized and shaped to substantially cover the airbag cushion and inflator assembly, and has an open base sized to receive the airbag cushion and inflator assembly. The open base is partly defined by a first side edge and a second side edge of the assembly cover and a first retainer arm extends from the first side edge and a second retainer arm extends from the second side edge. The first retainer arm defines two spaced-apart projection-receiving holes, and the second retainer arm also defines two spaced-apart projection-receiving holes. The opposed retainer arms are sized and shaped to encircle or tightly hug the airbag cushion and inflator assembly with distal ends of the opposed retainer arms overlapping and positioned so that the two mounting projections extending from the airbag cushion and inflator assembly extend through the two projection-receiving holes defined by the first retainer arm and the two projection-receiving holes defined by the second retainer arm to secure the airbag module case to the airbag module.

16 Claims, 4 Drawing Sheets

5,568,936

AIRBAG MODULE CASE FOR SIDE IMPACT AIRBAG MODULE

FIELD OF THE INVENTION

The present invention relates to an airbag module and, more particularly, to an airbag module case for use with a side impact airbag module that mounts on the exterior of a motor vehicle seat.

BACKGROUND OF THE INVENTION

An airbag module is part of an inflatable restraint system that is employed in an automobile for protecting an occupant against injury by physically restraining the occupant's body when the automobile encounters a collision. The airbag module normally includes an airbag cushion and an inflator that, once triggered by a remote collision sensor, provides the inflation gas for inflating the airbag cushion. As its name implies, a side impact airbag module protects an occupant against an impact to the side of the automobile and is normally positioned somewhere between the occupant and the side of the automobile closest to the occupant. One option for positioning a side impact airbag location which has proven advantageous is on the side of a seat back of a seat, adjacent the center pillar of the auto. This position is advantageous because the airbag is kept in the optimum firing position, adjacent the driver's upper body, as the seat back is adjusted.

Currently, most seat mounted airbag modules are designed to be installed internally within the seat behind the padding and the upholstery of the seat cover. These internal installations, however, require substantial changes to the design of the seat and also require the seat assembler to handle the airbag module. Internal installations, therefore, increase the chances of module damage during assembly into the seat as well as provide difficulties in accessing the module thereafter for servicing purposes or replacement. Due to these problems and other possible seat structure design concerns, side impact airbag modules that attach to the exterior of seats and are fastened to the exterior of the seats during assembly of the automobile and not during assembly of the seat are being introduced.

Since these airbag modules will be exposed on an exterior of a seat in the passenger compartment of a motor vehicle, there is a need for an airbag module cover or case that conceals and protects the airbag module, is aesthetically pleasing and blends in with the seat as much as possible, and is easily attached to the airbag module independently of the seat.

SUMMARY OF THE INVENTION

The present invention is directed to an airbag module case for use with a side impact airbag module that satisfies one or more of the above needs and to an airbag module employing such a case. In carrying out this invention, there is provided an airbag module case for use with a side impact airbag module adapted to mount to the exterior of a motor vehicle seat. The airbag module includes an airbag cushion and inflator assembly having a folded airbag cushion and an inflator connected together so that inflation gas from the inflator will inflate the airbag cushion. The airbag module also includes at least one mounting projection extending from the airbag cushion and inflator assembly that is adapted to extend into and be secured in the motor vehicle seat.

The airbag module case includes an assembly cover and at least two retainer arms. The assembly cover is sized and shaped to substantially conceal and protect any exposed portions of the airbag cushion and inflator assembly of the side-impact airbag module when the airbag module is mounted to the exterior of the motor vehicle seat. The assembly cover has an open base sized to receive the airbag cushion and inflator assembly, the open base is defined by at least one edge of the assembly cover. The at least two retainer arms are opposed and extend from the edge of the assembly cover. Each retainer arm has at least one projection receiving aperture located adjacent a distal end thereof. The opposed retainer arms are sized and shaped to tightly hug the airbag cushion and inflator assembly with the distal ends of the opposed retainer arms overlapping and positioned so that the at least one mounting projection extending from the airbag cushion and inflator assembly extends through the at least one projection receiving aperture of each retainer arm to secure the airbag module case to the side-impact airbag module.

The present invention, therefore, provides an airbag module cover or case that conceals and protects the airbag module, is aesthetically pleasing and blends in with the seat as much as possible, and is easily attached to the airbag module independently of the seat.

The invention together with further objects, features, advantages and aspects thereof, will be more clearly understood from the following description taken in connection with the accompanying drawings.

BRIEF DESCRIPTION OF THE DRAWINGS

The same reference numerals refer to the same elements throughout the various figures.

DETAILED DESCRIPTION OF THE INVENTION

Figure 1:
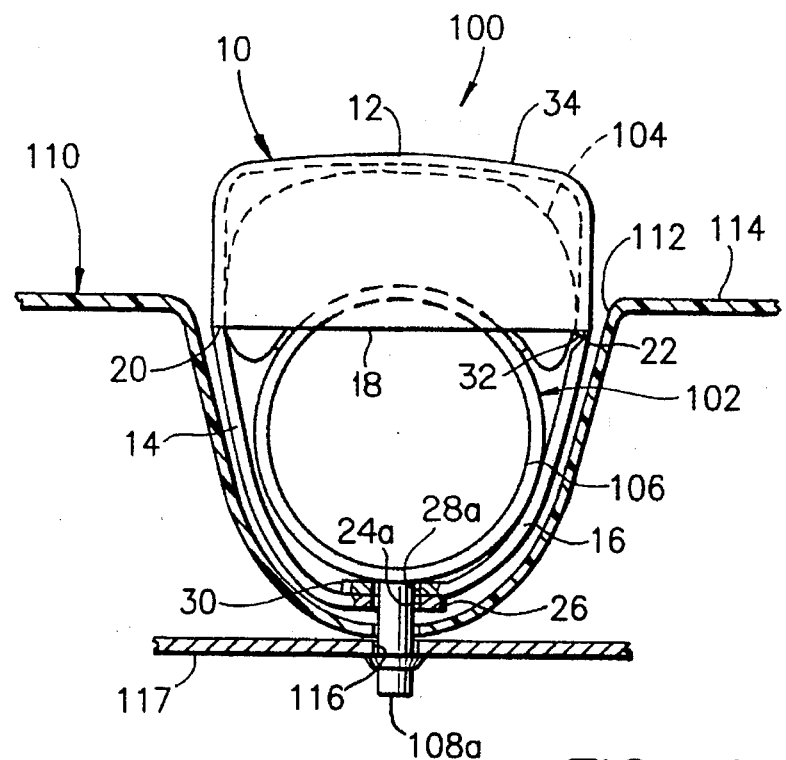
FIG. 1 is an elevational end view of an airbag module case according to the present invention shown secured to a side-impact airbag module assembly mounted to the exterior of a motor vehicle seat.

Referring to FIGS. 1 through 4, the present invention is directed to an airbag module case 10 for use as part of a side impact airbag module 100 that mounts on the exterior of a motor vehicle seat 110 having an access opening 112 in a seat cover 114 and receiving means 116 within an internal structural member 117.

The side impact airbag module 100 includes an airbag cushion and inflator assembly 102 having an airbag cushion 104 and an inflator 106 connected together so that inflation gas from the inflator 106 will inflate the airbag cushion 104. The airbag cushion and inflator assembly 102 is described generally as it relates to the instant invention. How an inflator 106 produces inflation gas and is actuated are both known in the art and, accordingly, are not described in detail as they do not in themselves constitute features of the present invention. As shown the airbag module 100 also has two mounting projections comprising self-fastening studs 108a,108b extending from the airbag cushion and inflator assembly 102, generally from the inflator 106, and adapted to extend into the motor vehicle seat 110 and be secured within the receiving means 116 of the internal structural member 117 to mount the airbag module to the seat. The self-fastening studs 108a,108b are also not described in detail as they do not in themselves constitute features of the present invention. However, it should be noted that the mounting projection could be provided in a forms other than mounting studs such a flat elongated mounting flange, for example, and that the studs have securing means for engaging the receiving means 116 of the structural member 117. The airbag module case according to the present invention can be adapted for use with airbag modules having other such mounting projections without departing from its true spirit and scope.

The airbag module case 10 is comprised of a suitable material such as thermoplastic polyurethane, for example, and includes an assembly cover 12, and a first retainer arm 14 and a second retainer arm 16 that are unitary with the assembly cover The retainer arms 14,16 are resiliently flexible. The assembly cover 12 is sized and shaped to substantially cover, conceal and protect any exposed portions of the airbag cushion and inflator assembly 102 of the side-impact airbag module 100 when the airbag module is mounted to the exterior of the motor vehicle seat 110. As shown, the assembly cover 12 is a generally rectangular box with a generally rectangular open base 18, but could be provided in another shape, for example oval or circular, to accommodate a different airbag cushion and inflator assembly 102. The generally rectangular open base 18 is sized and shaped to receive the airbag cushion and inflator assembly 102 and is partly defined by a first side edge 20 and an opposed second side edge 22. (The first and second side edges 20,22 are shown as broken lines as the first and second retainer arms 14,16 are unitary with the assembly cover 12.)

Figure 2:
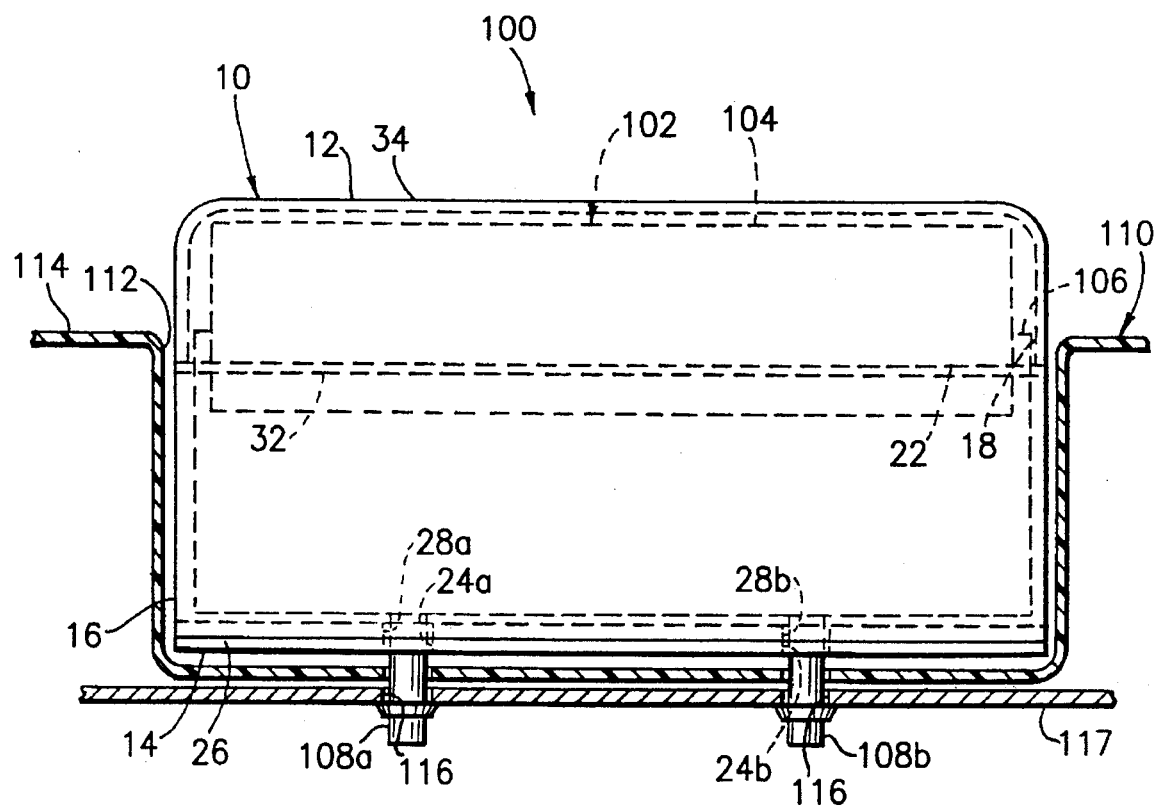
FIG. 2 is an elevational side view of the airbag module case of FIG. 1 shown secured to the side-impact airbag module assembly mounted to the exterior of a motor vehicle seat.
Figure 3:
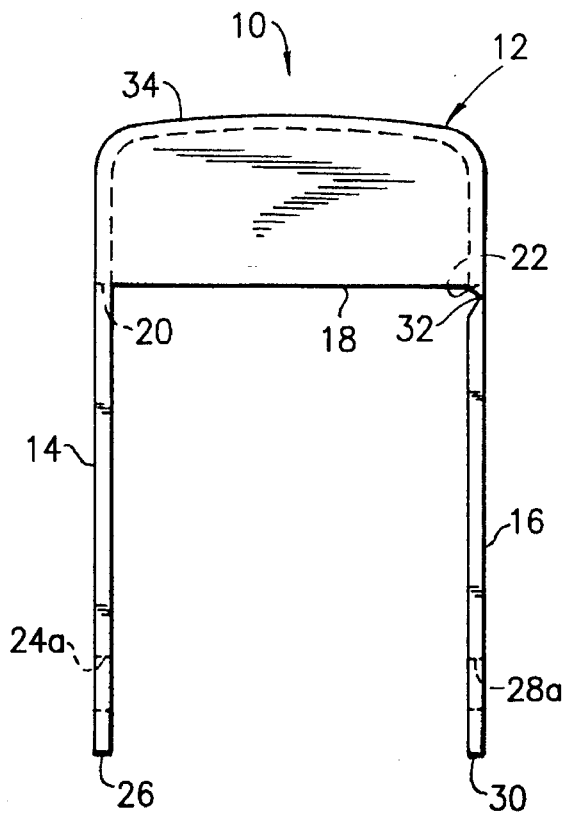
FIG. 3 is an elevational end view of the airbag module case of FIGS. 1 and 2.
Figure 4:
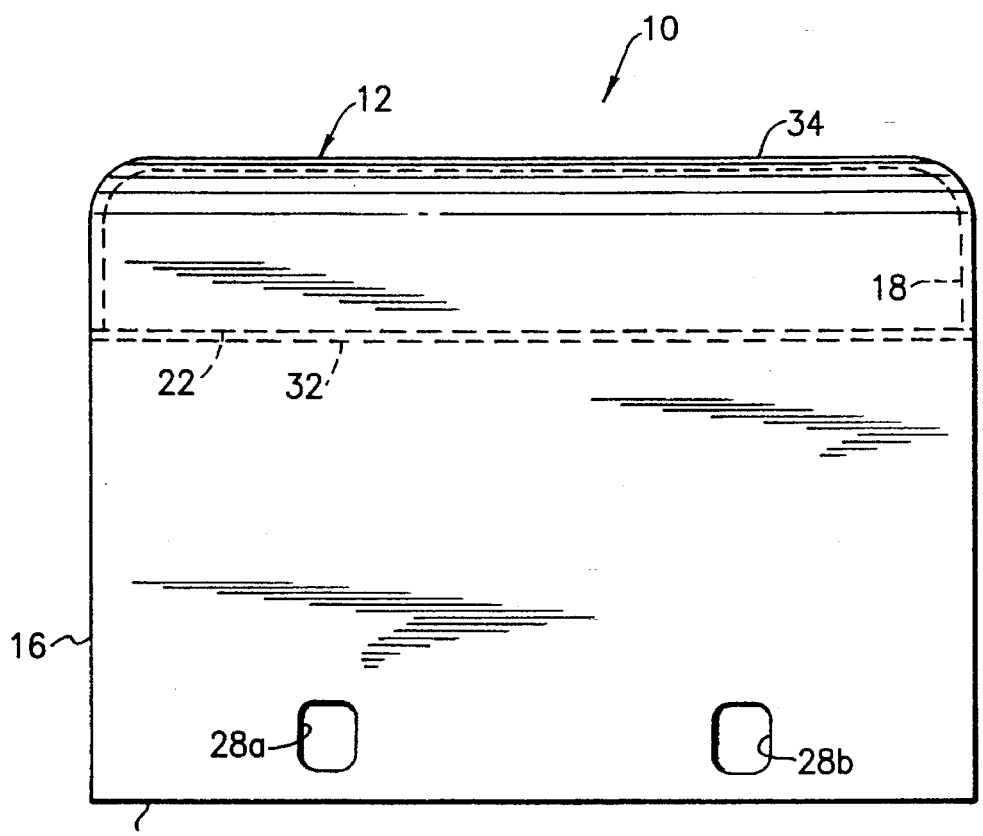
FIG. 4 is an elevational side view of the airbag module case of FIGS. 1 through 3.

The first retainer arm 14 extends from the first side edge 20 and the second retainer arm 16 opposes the first retainer arm and extends from the second side edge 22 of the assembly cover 12. As shown, the retainer arms 14,16 are generally rectangular and elongated. The first retainer arm 14 defines two spaced-apart projection receiving apertures 24a,24b comprising generally circular stud-receiving holes located adjacent a distal end 26 of the first retainer arm. The second retainer arm 16 defines two spaced-apart projection receiving apertures 28a,28b comprising generally circular stud-receiving holes located adjacent a distal end 30 of the second retainer arm. The two stud-receiving holes 26a,26b of the first retainer arm 14 and the two stud-receiving holes 28a,28b of the second retainer arm 16 are spaced-apart similar to the two self-fastening studs 108a,108b extending from the airbag cushion and inflator assembly 102. As shown in FIGS. 1 and 2, the opposed retainer arms 14,16 are sized and shaped to encircle and preferably tightly hug the airbag cushion and inflator assembly 102 with the distal ends 26,30 of the opposed retainer arms overlapping and positioned so that self-fastening stud 108a extending from the airbag cushion and inflator assembly 102 will extend through stud-receiving hole 28a defined by the second retainer arm 16 and stud-receiving hole 26a defined by the first retainer arm 14, and self-fastening stud 108b extending from the airbag cushion and inflator assembly will extend through stud-receiving hole 28b defined by the second retainer arm 16 and stud-receiving hole 26b defined by the first retainer arm to secure the airbag module case 10 to the airbag module 100. As shown, the distal end 26 of the first retainer arm 14 overlaps the distal end 30 of the second retainer arm 16, however, the distal end of the second retainer arm could alternatively overlap the distal end of the first retainer arm.

The airbag module case 10 also includes a tear seam 32 which is preferably located where the second retainer arm 16 meets the second side edge 22 of the assembly cover 12. Upon inflation of the airbag cushion 104, the expanding airbag cushion will cause the tear seam 32 to break open, with the assembly cover 12 pivoting out of the way about where the first retainer arm 14 meets the first side edge 20 of the assembly cover 12, so that the airbag cushion 104 can properly inflate.

The assembly cover 12 of the airbag module case 10 is adapted to substantially cover, conceal and protect the airbag cushion and inflator assembly 102, and be positioned adjacent the seat cover 114 once the airbag module 100 is mounted to the seat 110. Since the airbag module 100 is adapted to be mounted on the exterior of the seat 110, it is important that an outer surface 34 of the assembly cover 12 be aesthetically pleasing and blend in with the seat 110 as much as possible. The assembly cover 12, therefore, is provided with a class A, decorative, outer surface 34 (class refers to the quality of the surface with regards to looks, texture and other factors, with class A being the best available surface quality).

The airbag module case 10 is intended to be attached to the side-impact airbag module 100 prior to mounting the airbag module to the motor vehicle seat 110. The assembly cover 12 of the airbag module case 10 is first placed over the airbag cushion and inflator assembly 102, covering substantially all of the airbag cushion 104 and at least a portion of the inflator 106. Then the retainer arms 14,16 are wrapped around the remainder of the airbag cushion and inflator assembly 102 with the distal ends 26,30 of the retainer arms being pulled over the two self-fastening studs 108a,108b so that the studs can be inserted through the stud-receiving holes 24a,24b,28a,28b defined by the retainer arms. The thermoplastic polyurethane airbag module case 10 is resiliently flexible, which allows the case 10 to fit snugly around the airbag cushion and inflator assembly 102 by allowing the retainer arms 14,16 to stretch slightly so that the studs 108a,108b can be inserted through the stud-receiving holes 24a,24b,28a,28b defined by the retainer arms and then resiliently relax back to tightly hug the airbag cushion and inflator assembly and bind against the studs so as to be retained thereon.

The side impact airbag module 100 assembly is able to be mounted to the seat 110 by the automobile manufacturer during assembly of the automobile and not be required to be mounted by the seat manufacturer during assembly of the seat. The airbag module 100 is mounted to the seat 110 by simply inserting the two self-fastening studs 108a,108b through the access opening 112 in the seat cover 114 and into receiving means 116 within the seat 110. The present invention, therefore, provides an airbag module case 10 that conceals and protects the airbag module 100, is aesthetically pleasing and blends in with the seat as much as possible, and is easily attached to the airbag module 100, independently of the seat.

Figure 5:
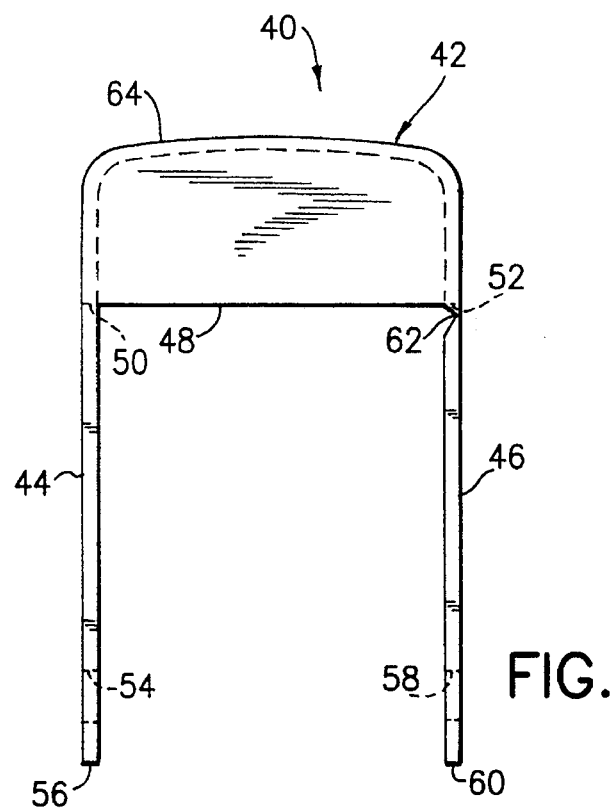
FIG. 5 is an elevational end view of another airbag module case according to the present invention.
Figure 6:
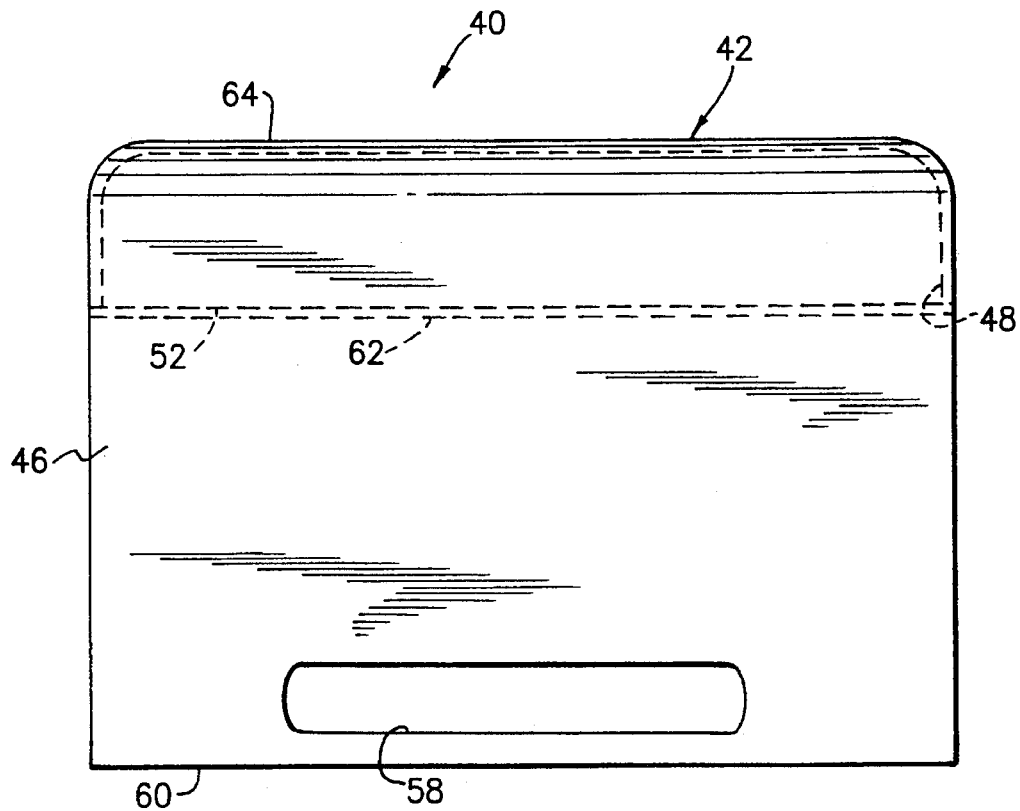
FIG. 6 is an elevational side view of the airbag module case of FIG. 5.

Referring to FIGS. 5 and 6, another airbag module case 40, similar to the airbag module case 10 of FIGS. 1 through 4, is shown and includes an assembly cover 42, and a first retainer arm 44 and a second retainer arm 46 that are unitary with the assembly cover 42. The assembly cover 42 is sized and shaped to substantially cover, conceal and protect any exposed portions of the airbag cushion and inflator assembly of the side-impact airbag module 100 when the airbag module is mounted to the exterior of the motor vehicle seat 110 (referring to the airbag module 1DO and seat 110 of FIGS. 1 and 2). The assembly cover 42 has a generally rectangular open base 48 partly defined by a first side edge 50 and an opposed second side edge 52. The first retainer arm 44 extends from the first side edge 50 and the second retainer arm 46 is opposite the first retainer arm and extends from the second side edge 52 of the assembly cover 42. The first retainer arm 44 defines a projection receiving aperture 54 comprising an elongated stud-receiving slot located adjacent a distal end 56 of the first retainer arm. The second retainer arm 46 defines a projection receiving aperture 58 comprising an elongated stud-receiving slot located adjacent a distal end 60 of the second retainer arm. The stud-receiving slot 54 of the first retainer arm 44 and the stud-receiving slot 58 of the second retainer arm 46 are long enough to receive both of the two self-fastening studs 108a,108b extending from the airbag module 100. The first and second retainer arms 44,46 are sized and shaped to encircle and preferably tightly hug the airbag cushion and inflator assembly 102 with the distal ends 56,60 of the retainer arms overlapping and positioned so that the two self-fastening studs 108a, 108b extending from the airbag cushion and inflator assembly 102 will extend through the stud-receiving slot 54 defined by the first retainer arm and the stud-receiving slot 58 defined by the second retainer arm to secure the airbag module case 40 to the side-impact airbag module 100. The airbag module case 40 also includes a tear seam 62 located where the second retainer arm 46 meets the second side edge 52 of the assembly cover 42. The assembly cover 42 is provided with a class A, decorative, outer surface 64.

Figure 7:
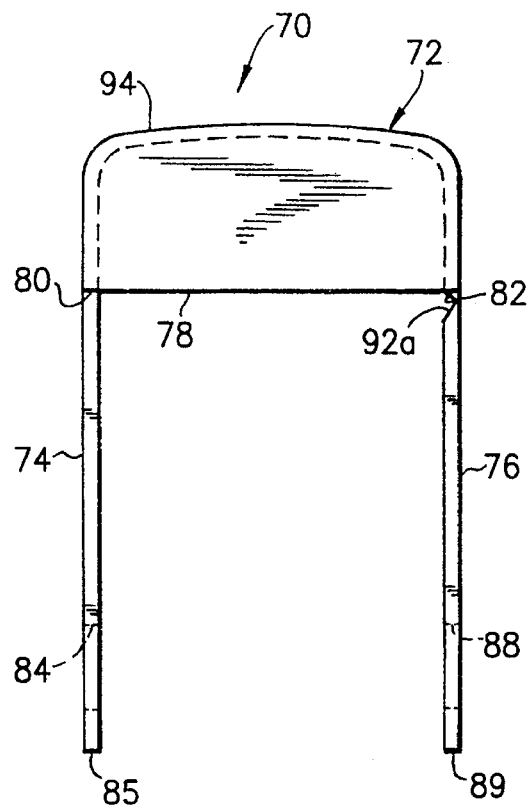
FIG. 7 is an elevational end view of an additional airbag module case according to the present invention.
Figure 8:
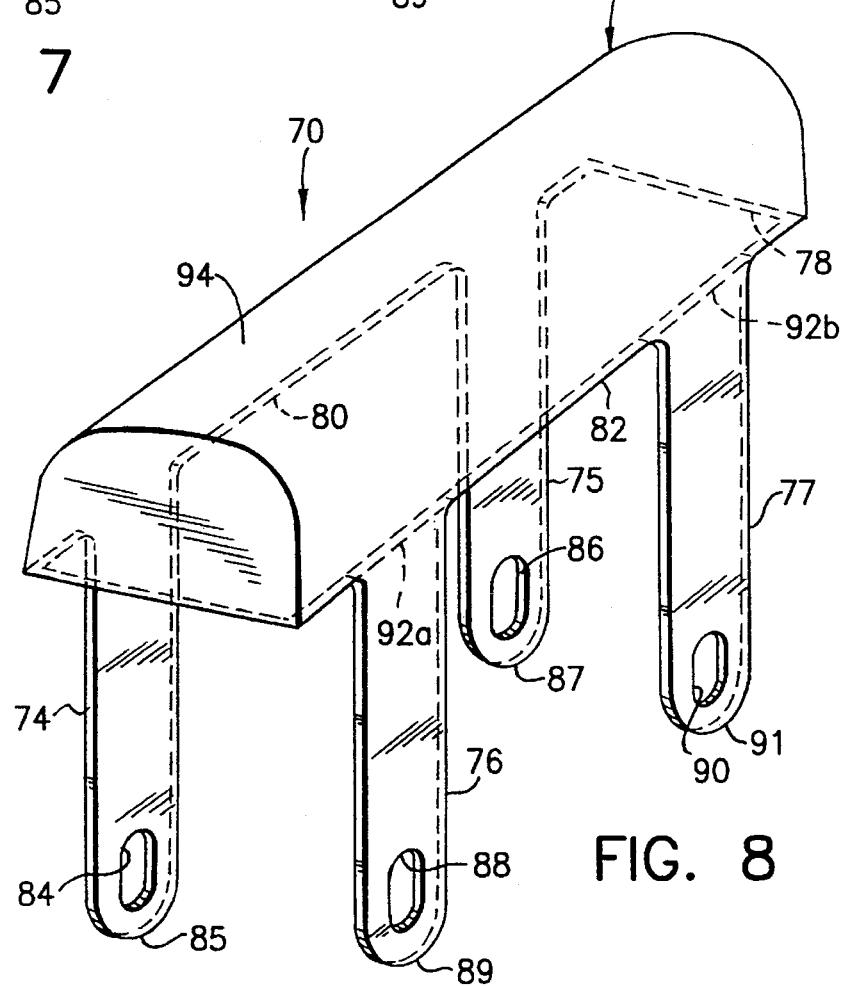
FIG. 8 is an elevational side view of the airbag module case of FIG. 7.

Referring to FIGS. 7 and 8, another airbag module case 70, similar to the airbag module case 10 of FIGS. 1 through 4, is shown and includes an assembly cover 72, and a first retainer arm 74, a second retainer arm 75, a third retainer arm 76 and a fourth retainer arm 77 that are unitary with the assembly cover. The assembly cover 72 is sized and shaped to substantially cover, conceal and protect any exposed portions of the airbag cushion and inflator assembly 102 of the side-impact airbag module 100 when the airbag module 100 is mounted to the exterior of the motor vehicle seat 110 (referring to the airbag module 100 and seat 110 of FIGS. 1 and 2). The assembly cover 72 has a generally rectangular open base 78 partly defined by a first side edge 80 and an opposed second side edge 82.

The first retainer arm 74 and the second retainer arm extend from the first side edge 80, and the third retainer arm 76 and the fourth retainer arm 77 extend from the second side edge 82 of the assembly cover 72. The first retainer arm 74 defines a projection receiving aperture 84 comprising a generally circular stud-receiving hole, located adjacent a distal end 85 of the first retainer arm. The second retainer arm 75 defines a projection receiving aperture 85 comprising a generally circular stud-receiving hole, located adjacent a distal end 86 of the second retainer arm. The third retainer arm 76 defines a projection receiving aperture 88 comprising a generally circular stud-receiving hole, located adjacent a distal end 89 of the third retainer arm. The fourth retainer arm 77 defines a projection receiving aperture 90 comprising a generally circular stud-receiving hole, located adjacent a distal end 91 of the fourth retainer arm.

The first retainer arm 74 and the third retainer arm 76 are opposed and are sized and shaped to encircle and preferably tightly hug the airbag cushion and inflator assembly 102 with the distal ends 85,89 overlapping and positioned so that self-fastening stud 108a extending from the airbag cushion and inflator assembly 102 will extend through the stud-receiving hole 88 defined by the third retainer arm and the stud-receiving hole 84 defined by the first retainer arm. The second retainer arm 75 and the fourth retainer arm 77 are opposed and are also sized and shaped to encircle and preferably tightly hug the airbag cushion and inflator assembly 102 with the distal ends 87,91 overlapping and positioned so that self-fastening stud 108b will extend through the stud-receiving hole 86 defined by the second retainer arm and the stud-receiving hole 90 defined by the fourth retainer arm to secure the airbag module case 70 to the side-impact airbag module 100. The airbag module case 70 also includes a first tear seam 92a located where the third retainer arm 76 meets the second side edge 80 of the assembly cover 72, and a second tear seam 92b located where the fourth retainer arm 77 meets the second side edge 82 of the assembly cover. The assembly cover 72 is provided with a class A, decorative, outer surface 94.

In addition, the present invention may include other changes and modifications without departing from its true spirit and scope. For example, the projection receiving aperture of the airbag module case may take other shapes to accommodate a different mounting projection of the airbag module, such as a slot to accommodate a mounting projection compromising a flange as opposed to a stud. The airbag module case may include additional retainer arms or additional projection receiving apertures depending on the number of mounting projections extending from the airbag module. Also, the assembly case may assume other shapes to accommodate differently configured airbag cushion and inflator assemblies. Furthermore, the airbag module case could include retainer arms that do not overlap. Instead a first retainer arm extending from the first side edge of the assembly cover could engage a first mounting stud, and a second retainer arm extending from the second side edge could engage a second mounting stud, for example. Many variations are possible.

Since other requirements and environments varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

We claim:

1. A thermoplastic airbag module case for use with a side impact airbag module adapted to mount on the exterior of a motor vehicle seat and including an airbag cushion and inflator assembly having a folded airbag cushion and an inflator connected together so that inflation gas from the inflator will inflate the airbag cushion, the airbag module case comprising:

an assembly cover sized and shaped to substantially cover the airbag cushion and inflator assembly of the side-impact airbag module when the airbag module is mounted to the exterior of the motor vehicle seat, the assembly cover having a decorative outer surface and at least one edge defining an open base sized and shaped to receive the airbag cushion and inflator assembly; and at least two flexible, opposed retainer arms extending from the at least one edge of the assembly cover, the opposed retainer arms being sized and shaped to substantially encircle the airbag cushion and inflator assembly with each retainer arm defining at least one projection receiving aperture located adjacent a distal end of the retainer arm for receiving at least one projection extending from the airbag cushion and inflator assembly to secure the airbag module case to the side-impact airbag module.

2. The airbag module case of claim 1 further comprising a tear seam located where one of the at least two retainer arms meets the at least one edge of the assembly cover.

3. The airbag module case of claim 1 wherein the distal ends of the opposed retainer arms overlap so that at least one projection extending from the airbag cushion and inflator assembly can extend through the at least one projection receiving aperture of both retainer arms.

4. The airbag module case of claim 3 wherein the at least two opposed retainer arms of the airbag module case comprise a first retainer arm extending from the at least one edge of the assembly cover and a second retainer arm extending from the at least one edge of the assembly cover opposite the first retainer arm, the at least one projection receiving aperture of each retainer arm comprising two spaced-apart, stud-receiving openings adapted to receive two spaced-apart, self-fastening studs extending from the airbag cushion and inflator assembly.

5. The airbag module case of claim 4 wherein the stud-receiving openings are generally circular.

6. The airbag module case of claim 3 wherein the at least two opposed retainer arms of the airbag module case comprise a first retainer arm extending from the at least one edge of the assembly cover and a second retainer arm extending from the at least one edge of the assembly cover opposite the first retainer arm, the at least one projection receiving aperture of each retainer arm comprising an elongated, stud-receiving slot adapted to receive two spaced-apart, self-fastening studs extending from the airbag cushion and inflator assembly.

7. The airbag module case of claim 3 wherein the at least two opposed retainer arms of the airbag module case comprise a first and second retainer arm extending from the at least one edge of the assembly cover and a third and fourth retainer arm extending from the at least one edge of the assembly cover opposite the first and second retainer arms, the at least one projection receiving aperture of each retainer arm comprising a stud-receiving opening adapted to receive a self-fastening stud extending from the airbag cushion and inflator assembly.

8. The airbag module case of claim 7 wherein the stud-receiving openings are generally circular.

9. A side-impact airbag module adapted to mount on the exterior of a motor vehicle seat, the airbag module comprising:

an airbag cushion and inflator assembly having a folded airbag cushion and an inflator connected together so that inflation gas from the inflator will inflate the airbag cushion; and a thermoplastic airbag module case including an assembly cover substantially covering the airbag cushion and inflator assembly when the airbag module is mounted to the exterior of the motor vehicle seat, the assembly cover having a decorative outer cover and at least one edge defining an open base receiving the airbag cushion and inflator assembly, and at least two flexible, opposed retainer arms extending from the at least one edge of the assembly cover, each retainer arm defining at least one projection receiving aperture located adjacent a distal end of the retainer arm, the opposed retainer arms substantially encircling the airbag cushion and inflator assembly and positioned so that at least one projection extending from the airbag cushion and inflator assembly extends through the at least one projection receiving aperture of each retainer arm securing the airbag module case to the airbag cushion and inflator assembly.

10. The airbag module of claim 9 wherein the airbag module case further includes a tear seam located where one of the at least two retainer arms meets the at least one edge of the assembly cover.

11. The airbag module of claim 9 wherein the opposed retainer arms encircle the airbag cushion and inflator assembly with the distal ends of the opposed retainer arms overlapping and positioned so that at least one projection extending from the airbag cushion and inflator assembly extends through the at least one projection receiving aperture of both retainer arms.

12. The airbag module of claim 11 wherein the at least one projection comprises two spaced-apart mounting projections adapted to extend into and be secured within the motor vehicle seat, each mounting projection comprising a self-fastening stud, and the at least two opposed retainer arms of the airbag module case comprise a first retainer arm extending from the at least one edge of the assembly cover and a second retainer arm extending from the at least one edge of the assembly cover opposite the first retainer arm, the first retainer arm and the second retainer arm each defining two spaced-apart projection receiving apertures comprising stud-receiving openings receiving the self-fastening studs.

13. The airbag module of claim 12 wherein the stud-receiving openings are generally circular.

14. The airbag module of claim 11 wherein the at least one projection comprises two spaced-apart mounting projections adapted to extend into and be secured within the motor vehicle seat, each mounting projection comprising a self-fastening stud, and the at least two opposed retainer arms of the airbag module case comprise a first retainer arm extending from the at least one edge of the assembly cover and a second retainer arm extending from the at least one edge of the assembly cover opposite the first retainer arm, the first retainer arm and the second retainer arm each defining a projection receiving aperture comprising an elongated stud-receiving slot receiving both self-fastening studs.

15. The airbag module of claim 11 wherein the at least one projection comprises two spaced-apart mounting projections adapted to extend into and be secured within the motor vehicle seat, each mounting projection comprising a self-fastening stud, and the at least two opposed retainer arms of the airbag module case comprise a first and second retainer arm extending from the at least one edge of the assembly cover and a third and fourth retainer arm extending from the at least one edge of the assembly cover opposite the first and second retainer arms, each retainer arm defining a projection receiving aperture comprising a stud-receiving opening receiving a self-fastening stud.

16. The airbag module of claim 15 wherein the stud-receiving openings are generally circular.

* * * * *

UNITED STATES PATENT AND TRADEMARK OFFICE
CERTIFICATE OF CORRECTION

PATENT NO. :  5,568,936
DATED      :  October 29, 1996
INVENTOR(S) : Spilker et al.

It is certified that error appears in the above-indentified patent and that said Letters Patent is hereby corrected as shown below:

Col. 3, Ln. 32,  "cover" should read -- cover 12. -- .
Col. 5, Ln. 13,  "1DO" should read -- 100 -- .
Col. 7, Ln. 18,  "that at least one" should read
                 -- that the at least one -- .

Signed and Sealed this

Eleventh Day of November, 1997

Attest:

BRUCE LEHMAN

*Attesting Officer*    Commissioner of Patents and Trademarks